United States Patent
Makulec et al.

(10) Patent No.: US 8,485,936 B2
(45) Date of Patent: Jul. 16, 2013

(54) PLANET SHAFT RETENTION IN PLANETARY GEAR SYSTEM

(75) Inventors: Jeffrey M. Makulec, Rockford, IL (US); Matthew Slayter, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 378 days.

(21) Appl. No.: 12/839,437

(22) Filed: Jul. 20, 2010

(65) Prior Publication Data

US 2012/0017723 A1  Jan. 26, 2012

(51) Int. Cl.
*F16H 57/08* (2006.01)

(52) U.S. Cl.
USPC ........................................ 475/331; 475/159

(58) Field of Classification Search
USPC ......................................... 475/159, 331, 348
See application file for complete search history.

(56) References Cited

U.S. PATENT DOCUMENTS

| | | | |
|---|---|---|---|
| 4,104,933 A | 8/1978 | Campbell | |
| 4,359,914 A * | 11/1982 | Meisel, Jr. | 475/346 |
| 5,242,336 A | 9/1993 | Hori | |
| 5,649,879 A * | 7/1997 | Kusumoto et al. | 475/331 |
| 6,527,660 B1 | 3/2003 | Sugden | |
| 6,676,558 B2 | 1/2004 | Futterer | |
| 6,719,658 B2 | 4/2004 | Haga et al. | |
| 6,960,147 B2 | 11/2005 | Kolstrup | |
| 7,250,688 B2 | 7/2007 | Thomson | |
| 7,422,540 B2 | 9/2008 | Neudecker et al. | |
| 7,708,663 B2 | 5/2010 | Himmelmann et al. | |
| 7,737,591 B2 | 6/2010 | Himmelmann et al. | |
| 8,246,503 B2 * | 8/2012 | Sheridan et al. | 475/159 |
| 2004/0192491 A1 * | 9/2004 | Becquerelle et al. | 475/331 |
| 2006/0293142 A1 * | 12/2006 | Torres et al. | 475/331 |
| 2007/0225111 A1 * | 9/2007 | Duong et al. | 475/331 |
| 2011/0105270 A1 * | 5/2011 | Matsuoka et al. | 475/331 |
| 2012/0238401 A1 * | 9/2012 | McCune et al. | 475/331 |

* cited by examiner

*Primary Examiner* — Justin Holmes
*Assistant Examiner* — Huan Le
(74) *Attorney, Agent, or Firm* — Carlson, Gaskey & Olds, PC

(57) ABSTRACT

A planet shaft for supporting a planet gear has a supporting portion extending along a central axis and having a first outer diameter. A flange is formed at one end of the supporting portion, which has a smaller section formed about a portion of a circumference around the central axis, and an enlarged portion extending away from the central axis for a greater distance than the smaller portion. A hole to receive a lock member is formed in the enlarged portion. A planetary gear assembly including such a planet shaft is disclosed as is an air turbine starter including the planetary gear system. Further, a method of installing a planet gear and planet shaft is also disclosed and claimed.

23 Claims, 3 Drawing Sheets

PLANET SHAFT RETENTION IN PLANETARY GEAR SYSTEM

BACKGROUND

This application relates to a retention feature for retaining a planet shaft against rotation in a planetary gear system.

Planetary gear systems are well known, and have been utilized to provide a gear change between an input and an output. A sun gear rotates about a central axis, and a ring gear rotates outwardly of the sun gear. A plurality of planet gears are positioned to transmit rotation between the sun and ring gears.

In one known type of planetary gear system, the planet gears are mounted on stationary shafts positioned inwardly of the gears. The planet shaft provides an inner race for bearings which support the planet gears.

One application of a planetary gear system is in an air turbine starter system. In an air turbine starter system, air is delivered across a turbine rotor to drive the rotor. The rotor drives a sun gear, which drives a ring gear through planet gears. The ring gear in turn drives a starter shaft for a gas turbine engine.

In such applications, a good deal of force is transmitted to the planet shafts, which should remain stationary within a fixed housing. In the prior art, the planet shaft received a set screw which extends radially inwardly at an axially intermediate location. The set screw extends generally directly radially inwardly relative to a rotational axis of the associated planet gear, or a central axis of the shaft.

SUMMARY

A planet shaft for supporting a planet gear has a supporting portion extending along a central axis and having a first outer diameter. A flange is formed at one end of the supporting portion, which has a smaller section formed about a portion of a circumference around the central axis, and an enlarged portion extending away from the central axis for a greater distance than the smaller portion. A hole to receive a lock member is formed in the enlarged portion. A planetary gear assembly including such a planet shaft is disclosed as is an air turbine starter including the planetary gear system. Further, a method of installing a planet gear and planet shaft is also disclosed and claimed.

These and other features of the present invention can be best understood from the following specification and drawings, the following of which is a brief description.

DETAILED DESCRIPTION

Figure 1:
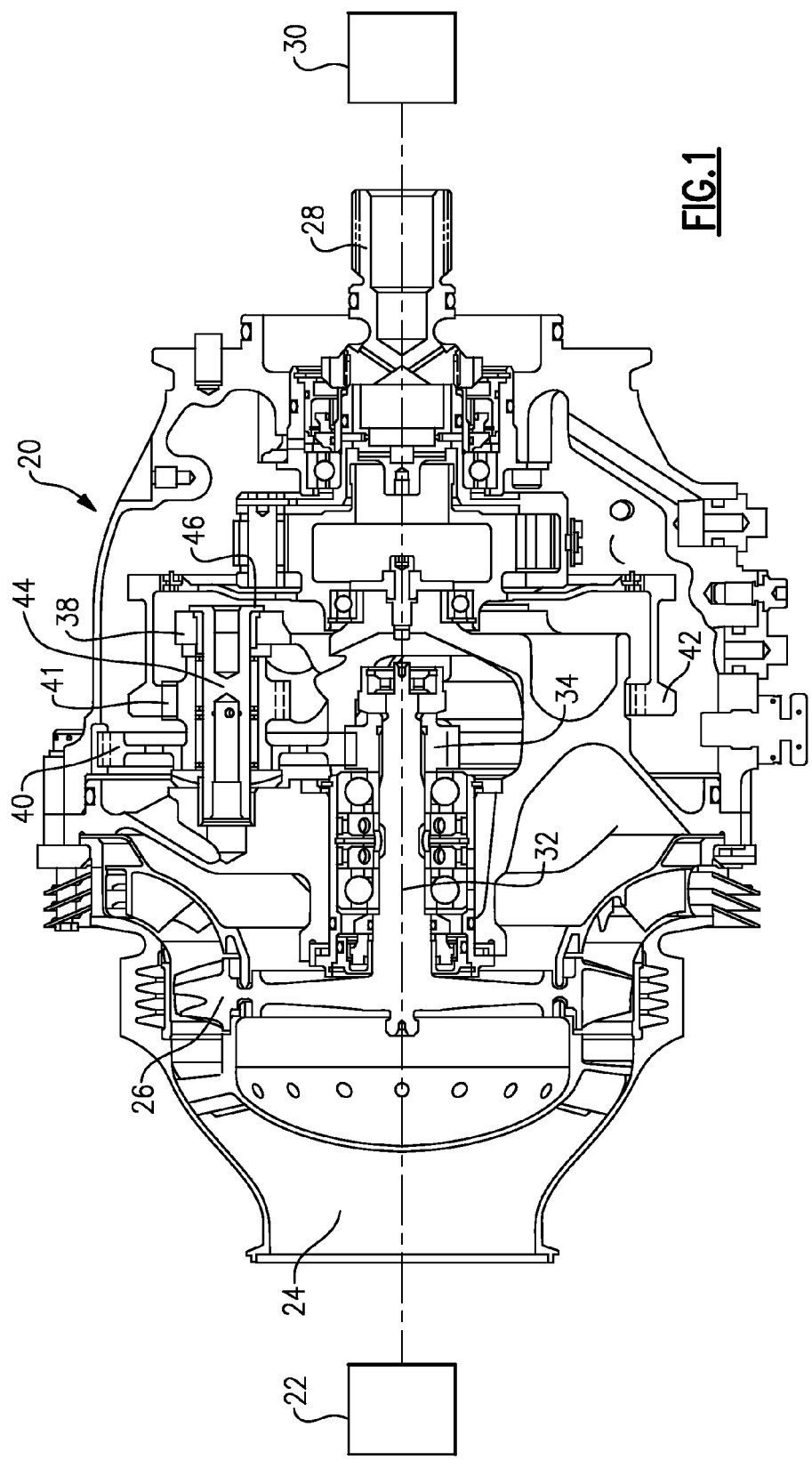
FIG. 1 shows an air turbine starter assembly.

An air turbine starter assembly 20 may be associated with an aircraft, or other systems including a gas turbine engine. A source of hot air 22, which may be from an auxiliary power unit, as typically utilized while on the ground, delivers hot, high pressure air into an inlet 24. The high pressure air flows across a turbine rotor 26, causing the turbine rotor 26 to rotate. As the turbine rotor 26 rotates, it rotates an output shaft 28 through a planetary gear system. The output shaft 28 may be utilized as a starter, to start operation of a main gas turbine engine 30.

The planetary gear system includes a sun gear 34 that is driven by a rotor shaft 32 that rotates with the turbine rotor 26. The sun gear 34 in turn drives a plurality of planet gears 40. The planet gears 40 include output gear teeth 41, which drive a ring gear 42. The ring gear 42 drives the output shaft 28 through a mechanical connection.

The planet gears 40 rotate on a stationary planet shaft 44. The stationary planet shaft 44 includes an end flange 46 that is fixed to prevent rotation relative to a housing 38.

Figure 2:
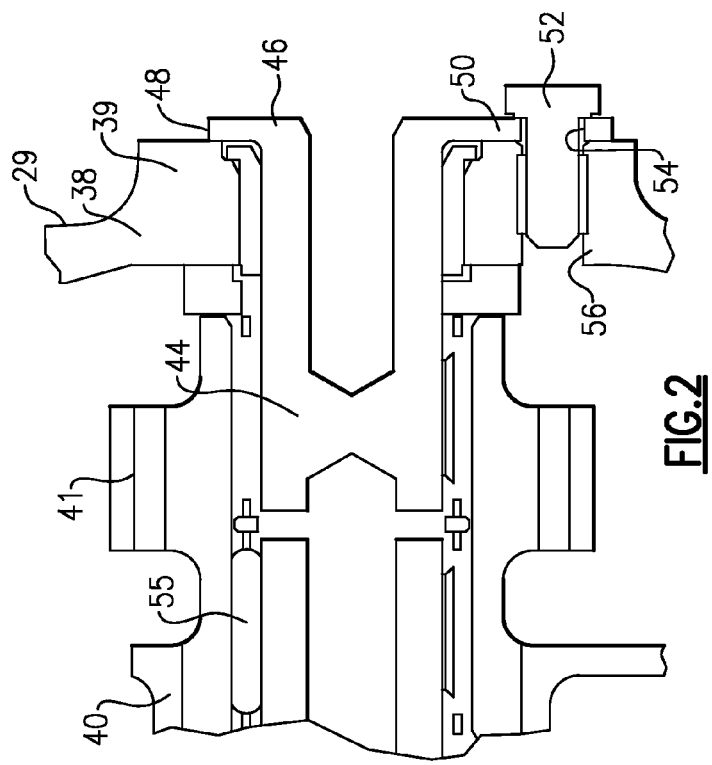
FIG. 2 shows a feature of a planet shaft.

As shown in FIG. 2, the planet shaft 44 provides an inner bearing race for a plurality of bearings 55 and supporting a planet gear 40. As shown, the flange 46 has a cylindrical or smaller portion 48, and an enlarged offset portion 50. Bolts 52 extend through an opening or hole 54 in the enlarged portion 50, and are threaded into an opening 56 in the housing 38. Of course, lock members other than bolts can be used. As shown in FIG. 2, the housing 38 has an enlarged portion 39, against which the flange 46 sits, and a removed portion 29.

Figure 3:
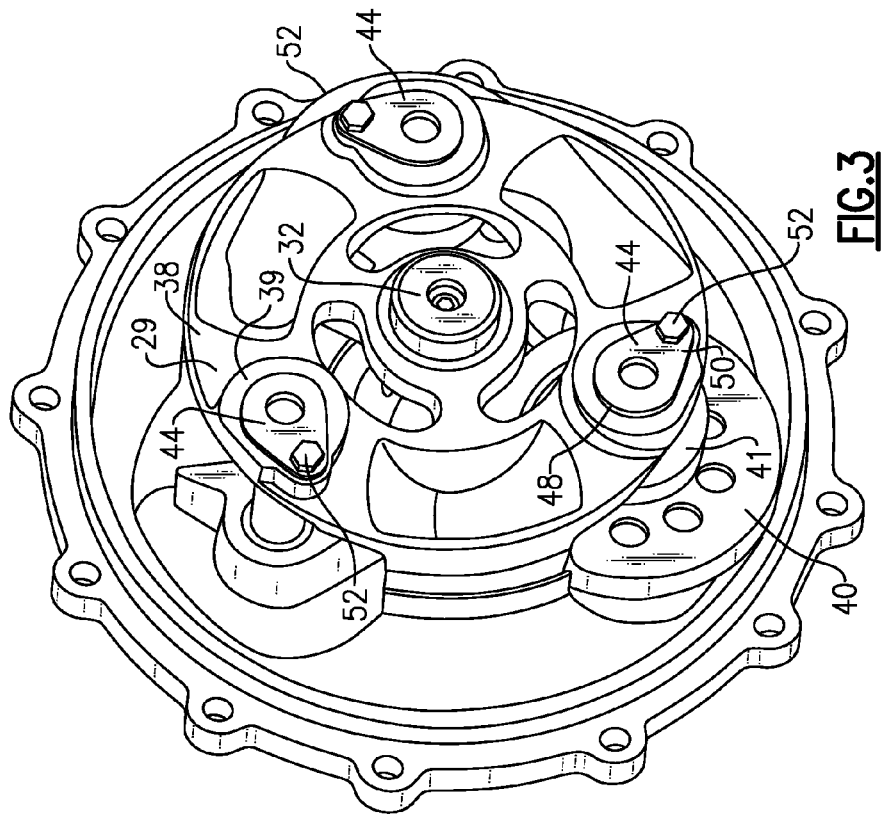
FIG. 3 shows a portion of a planetary gear system.

As shown in FIG. 3, there are three sets of planet gears 40 in this embodiment. Of course, other number of planet gears can be utilized. Each of the planet gears 40 are associated with a planet shaft 44, and each of the planet shafts 44 have the enlarged portion 50. As shown, the enlarged portion 50 of the three illustrated planet shafts 44 all extend in the same circumferential direction. This may not be necessary in all embodiments, but is true of the illustrated embodiment.

As shown, the housing 38 has the enlarged portions 39 which have a shape with a cylindrical portion and an enlarged portion to support and match the flange 46. Removed portions 29 remote from the enlarged portion 39 are curved away.

Figure 4:
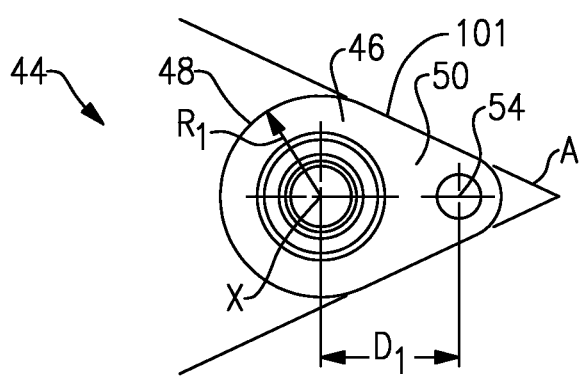
FIG. 4 shows an end view of the planet shaft.

As shown in FIG. 4, the flange 46 has the nominal, cylindrical or part-circular portion 48 formed at a distance $R_1$ from a center axis X, and the enlarged portion 50. Enlarged portion 50 includes the hole 54 which is centered on an axis spaced from the axis X by a distance $D_2$. In one embodiment, the distance $R_1$ was 0.49" (1.2 cm), while the distance $D_1$ was 0.68" (1.7 cm). In embodiments, a ratio of $D_1$ to $R_1$ is between 1.2 and 1.6.

As further shown, the enlarged portion 50 extends generally along two angled extensions 101 from the cylindrical portion 48, and across an angle A. The angle A in one embodiment was 49.5°, and preferably between 40 and 60°. The part-circular portion extends across the rest of 360°.

Figure 5:
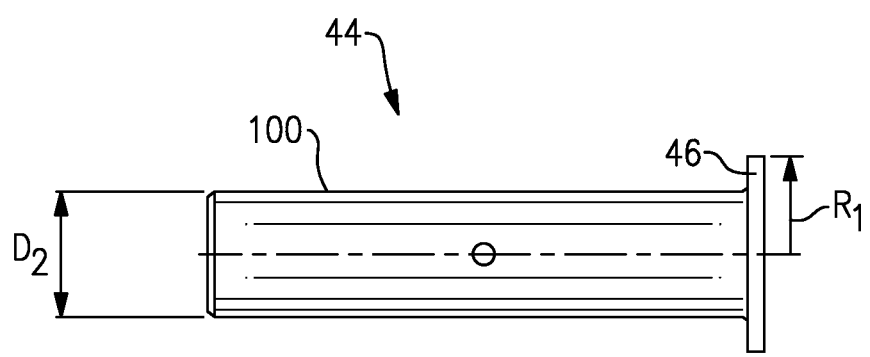
FIG. 5 is a side view of the planet shaft.

As shown in FIG. 5, the planet shaft 44 has a supporting portion 100, which provides the inner bearing race. The flange 46 is formed at an end of the support portion 100. The support portion 100 has a diameter $D_2$. In one embodiment, $D_2$ was 0.57" (1.4 cm). Preferably, the distance $D_1$ is greater than the distance $D_2$, and a ratio of $D_1$ to $D_2$ is between 1.1 and 1.5.

One geometric difference between the invention and the prior art is that the bolt 52 extends along an axis which is parallel to a rotational axis of the gear 40, or a central axis of the shaft 44.

The disclosed embodiment improves the reliability of axial retention of the shaft, by seating the flange onto the mating housing face and clamping it with a bolt. The bolt provides for a high clamp load compared to the prior art. In addition, there is improved reliability of tangential retention, even if the clamp load is lost since the bolt mechanically sits within the flange, preventing rotation. Further, the assembly of the shaft is simplified to ensure a correct rotational orientation, since the flange is at an exposed end of the shaft and provides a visual cue to the proper orientation. Further, the flange provides a handle to position the shaft correctly before it is bolted into place.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A planet shaft for supporting a planet gear comprising:
   a supporting portion extending along a central axis;
   a flange formed at one end of said supporting portion, said flange having a smaller section formed about a portion of a circumference around said central axis, and an enlarged portion, said enlarged portion extending away from said central axis for a greater distance than said smaller portion, a hole to receive a lock member being formed in the enlarged portion; and
   said smaller portion is a part-circular portion having an outer periphery at a first radius.

2. The planet shaft as set forth in claim 1, wherein said enlarged portion extends generally along a pair of angled sides away from said part-circular portion, and an angle defined between said angled sides is between 40° and 60°.

3. The planetary shaft as set forth in claim 1, wherein said enlarged portion ensuring a correct rotational orientation of the planet shaft when mounted to a fixed housing.

4. The planet shaft as set forth in claim 1, wherein said hole in said enlarged portion is centered on a hole axis spaced by said central axis by a second distance, a ratio of said second distance to said first radius is between 1.2 and 1.6.

5. The planet shaft as set forth in claim 4, wherein a ratio of said second distance to an outer diameter of said supporting portion is between 1.1 and 1.5.

6. A planetary gear assembly comprising:
   a sun gear;
   a plurality of planet gears driven by said sun gear;
   said plurality of planet gears engaged to drive a ring gear;
   a fixed housing for supporting said planet gears;
   said planet gears including a bearing within an inner peripheral bore in said planet gears, and a planet shaft in each said planet gear supported within said bearing, said planet shaft including a supporting portion extending along a central axis;
   a flange formed at one end of said supporting portion, said flange having a smaller section formed about a portion of a circumference around said central axis, and an enlarged portion, said enlarged portion extending away from said central axis for a greater distance than said smaller portion; and
   a hole formed in each said enlarged portion, and a lock member extending through each said hole and into said housing.

7. The planetary gear assembly as set forth in claim 6, wherein said enlarged portion ensuring a correct rotational orientation of the planet shaft as fixed to said fixed housing.

8. The planetary gear assembly as set forth in claim 6, wherein said smaller portion is a part-circular portion having an outer periphery at a first radius.

9. The planetary gear assembly as set forth in claim 8, wherein said hole in said enlarged portion is centered on a hole axis spaced by said central axis by a second distance, a ratio of said second distance to said first radius is between 1.2 and 1.6.

10. The planetary gear assembly as set forth in claim 9, wherein a ratio of said second distance to an outer diameter of said supporting portion is between 1.1 and 1.5.

11. The planetary gear assembly as set forth in claim 8, wherein said enlarged portion extends generally along a pair of angled sides away from said part-circular portion, and an angle defined between said angled sides is between 40° and 60°.

12. The planetary gear assembly as set forth in claim 8, wherein said housing includes a plurality of enlarged portions having a part-circular portion, and an enlarged portion which sit in support of said flange, and with portions of an outer housing face remote from said part-circular portion and said enlarged portion being further axially removed from said flange.

13. An air turbine starter comprising:
   an air inlet for directing air across a turbine rotor, said turbine rotor being driven to rotate by the air, and drive a turbine shaft, said turbine shaft driving a planetary gear system by driving a sun gear;
   a plurality of planet gears driven by said sun gear;
   said plurality of planet gears engaged to drive ring gear;
   a fixed housing for supporting said planet gears;
   said planet gears including a bearing within an inner peripheral bore in said planet gears, and a planet shaft in each said planet gear supported within said bearing, said planet shaft including a supporting portion extending along a central axis;
   a flange formed at one end of said supporting portion, said flange having a smaller section formed about a portion of a circumference around said central axis, and an enlarged portion, said enlarged portion extending away from said central axis for a greater distance than said smaller portion; and
   a hole formed in each said enlarged portion, and a lock member extending through each said hole and into said housing.

14. The air turbine starter as set forth in claim 13, wherein said enlarged portion ensuring a correct rotational orientation of the planet shaft as fixed to said fixed housing.

15. The air turbine starter as set forth in claim 13, wherein said smaller portion is a part-circular portion having an outer periphery at a first radius.

16. The air turbine starter as set forth in claim 15, wherein said hole in said enlarged portion is centered on a hole axis spaced by said central axis by a second distance, and a ratio of said second distance to said first radius is between 1.2 and 1.6.

17. The air turbine starter as set forth in claim 16, wherein a ratio of said second distance to an outer diameter of said supporting portion is between 1.1 and 1.5.

18. The air turbine starter as set forth in claim wherein said enlarged portion extends generally along a pair of angled sides away from said part-circular portion, and an angle defined between said angled sides is between 17° and 60°.

19. The air turbine starter as set forth in claim 15, wherein said housing includes a plurality of enlarged portions having a part-circular portion, and an enlarged portion which sit in support of said flange, and with portions of an outer housing face remote from said part-circular portion and said enlarged portion being further axially removed from said flange.

20. A method of installing a planet shaft for a planet gear comprising the steps of:
   (a) providing a planet shaft, and mounting bearings on an outer periphery of a support portion of said planet shaft, said planet shaft being mounted in a fixed housing, with said support portion extending into an interior bore in said housing, and a flange of said planet shaft being positioned on an opposed outer face of said outer housing; and (b) aligning a hole in an enlarged portion of said flange with a hole in said housing, and inserting a lock member through said hole and into said housing to lock said planet shaft.

21. The method as set forth in claim 20, wherein said alignment step (b) includes providing an enlarged surface on the outer face of said housing, with other portions of said outer face remove from said enlarged portion being spaced further away from said flange.

22. The method as set forth in claim 20, wherein the lock member is a threaded bolt which is threaded into a threaded hole in said housing.

23. The method as set forth in claim 20, wherein said enlarged portion ensuring a correct rotational orientation of the planet shaft as fixed to said fixed housing.

\* \* \* \* \*

UNITED STATES PATENT AND TRADEMARK OFFICE
CERTIFICATE OF CORRECTION

| | | |
|---|---|---|
| PATENT NO. | : 8,485,936 B2 | Page 1 of 1 |
| APPLICATION NO. | : 12/839437 | |
| DATED | : July 16, 2013 | |
| INVENTOR(S) | : Makulec et al. | |

It is certified that error appears in the above-identified patent and that said Letters Patent is hereby corrected as shown below:

IN THE CLAIMS:

Claim 13, Column 4, Line 22: "drive ring" should read as --drive a ring--

Claim 18, Column 4, Line 54: Change "17°" to --40°--

Signed and Sealed this
Twenty-fourth Day of September, 2013

Teresa Stanek Rea
*Deputy Director of the United States Patent and Trademark Office*